United States Patent Office 3,419,717
Patented Dec. 31, 1968

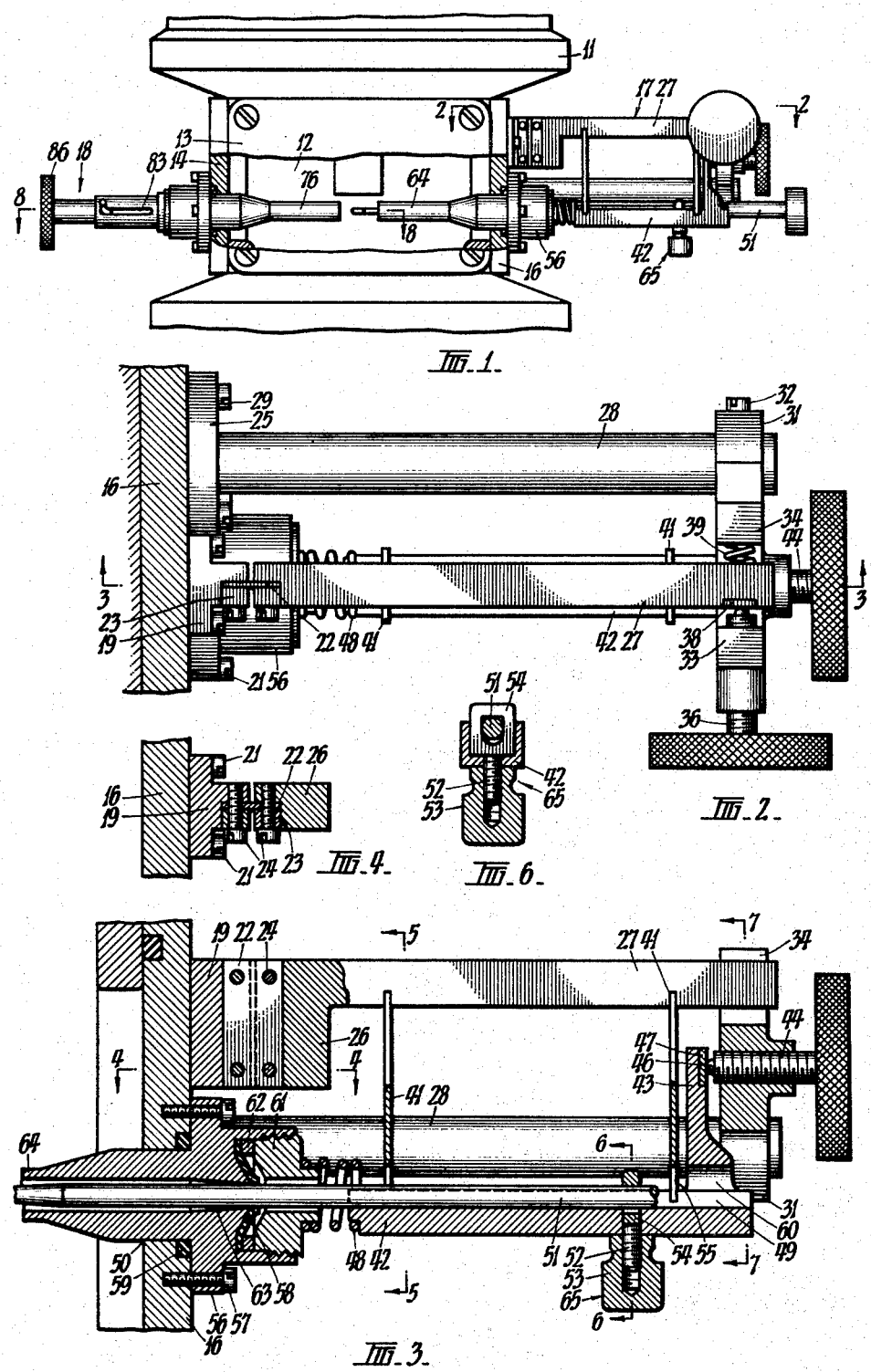

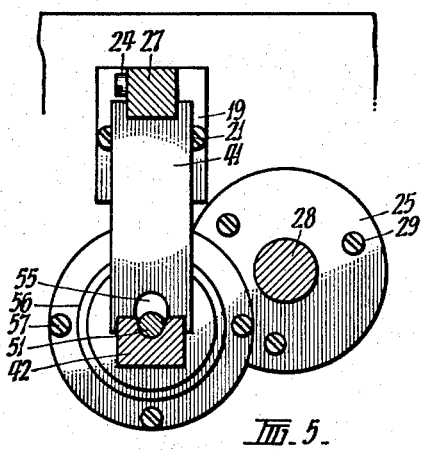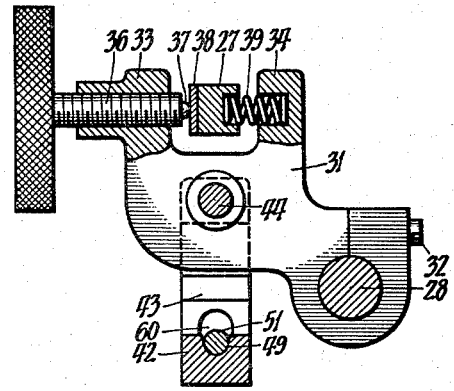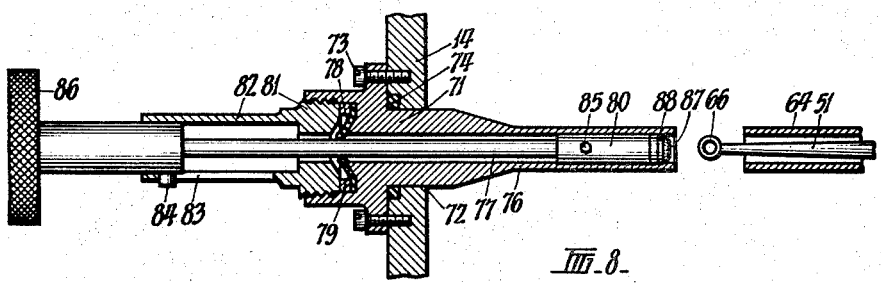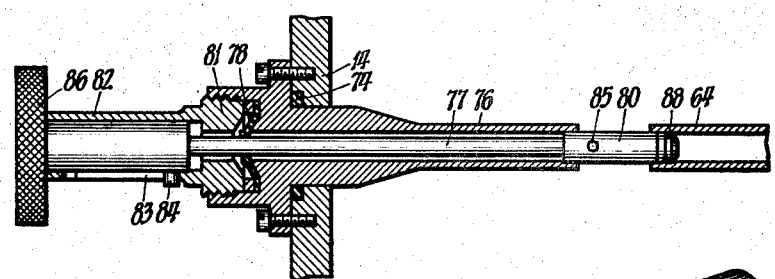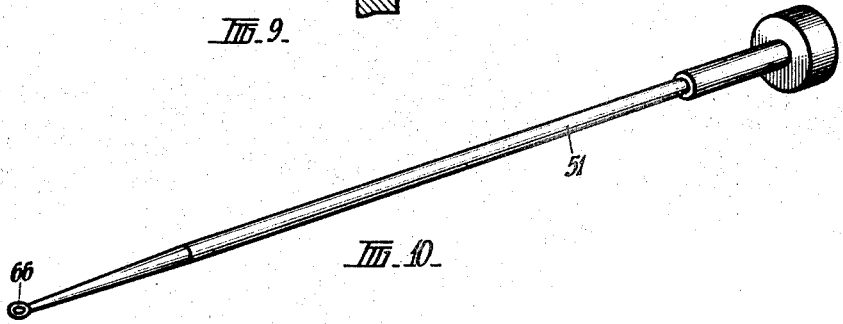

3,419,717
MANIPULATOR FOR ACCURATELY POSITIONING SPECIMENS WITHIN AN ELECTRON MICROSCOPE OR AN ELECTRON DIFFRACTION CAMERA
John Cunningham Mills, Springvale, Victoria, Australia, Assignor to Commonwealth Scientific and Industrial Research Organization, Victoria, Australia, a body corporate.
Filed Dec. 9, 1965, Ser. No. 512,671
Claims priority, application Australia, Dec. 10, 1964, 52,809/64
10 Claims. (Cl. 250—49.5)

ABSTRACT OF THE DISCLOSURE

Manipulator for accurately positioning objects within an enclosure chamber and constructed to extend inside the chamber so as to be controlled by means positioned outside the chamber, and including means mounted for pivotal movement about a fixed axis; and first and second control means respectively, for imparting controllable pivoting movement to the support means and for imparting axial movement to the manipulator.

---

This invention relates to manipulating apparatus and is concerned particularly, but not exclusively, with apparatus for manipulating specimens within electron microscopes or electron diffraction cameras.

Specimen manipulators conventionally fitted to electron diffraction cameras or in the high resolution electron diffraction position in electron microscopes operate via gears and screw threads mounted within the evacuated chamber of the instrument. Such manipulators are usually rather complicated and provided with a multiplicity of vacuum seals. They generally suffer from substantial mechanical hysteresis making it difficult accurately to position a specimen. The fact that much of the mechanism is mounted within the evacuated chamber of the instrument gives rise to a number of difficulties. Since the presence of oil or grease within the chamber cannot be tolerated, it is not possible to lubricate the mechanism and, since frictional forces are greatly increased under vacuum, these manipulators are usually very stiff in operation. Furthermore, when it is desired to examine specimens at another level within the chamber, the manipulator must be removed or else the mechanism within the chamber would interfere with the diffraction pattern or image. The complete manipulator is withdrawn and the opening in the wall of the chamber in which it was mounted is blanked off. This withdrawal destroys the vacuum within the chamber and the restoration thereof takes a considerable time, maybe of the order of hours.

It is an object of this invention to provide a manipulator which provides accurate and reproduceable movements.

It is a further object of the invention to provide such a manipulator which can be fitted to an electron microscope or diffraction camera for the purpose of manipulating specimens within the evacuated chamber of that instrument but with its adjustment mechanism outside the chamber. Other objects and advantages of the invention will become apparent from the ensuing description.

According to one aspect of the invention there is provided a manipulator for accurately positioning an object within an enclosed chamber comprising a manipulator arm supported outside the chamber and passing through a wall of the chamber to the interior thereof, wherein the arm is pivotally mounted in a seal at the position where it passes through the wall and is provided, on the outside of the chamber, with means for imparting controllable pivoting movement about said pivotal mounting and with means for imparting controllable movement along its longitudinal axis.

According to another aspect of the invention there is provided a manipulator comprising a fixed structure, a first adjustment member attached to the fixed structure by means of a flexible leaf element so that it can be swung about an axis by bending of said element and first adjustment means controllably so to swing the first adjustment member, a second adjustment member mounted on the first adjustment member by means of a plurality of parallel resilient leaf elements such that by resilient bending of the said parallel elements it can be moved in a substantially straight line path perpendicular to and passing through said axis and second adjustment means controllably so to move the second adjustment member, and a manipulator arm which is mounted on the second adjustment member and extends therefrom in the direction of said straight line path to a location beyond said axis. At the said location, the manipulator arm may be adapted to support a specimen. Alternatively the manipulator arm may, in use of the manipulator, be engaged at said location with an object to which it is desired to impart accurately controlled movement. Such an object could, for example, be an element of a mechanism also forming part of the manipulator.

Preferably the first adustment means comprises an adjustment screw threadably mounted on the fixed structure and a biasing spring which maintains the first adjustment member in engagement with the adjustment screw. Similarly, the second adjustment means preferably comprises a further adjustment screw threadably mounted on the fixed structure and a further biasing spring which maintains the second adjustment member in engagement with that further adjustment screw.

Manipulators according to the invention are particularly suitable for manipulating specimens within evacuated chambers of electron microscopes and diffraction cameras. For such an application, the fixed structure preferably comprises a plate adapted to form part of a wall of a chamber and the manipulator arm preferably extends through a vacuum seal located at the intersection of the manipulator arm with said axis.

In order that the invention may be more fully explained a preferred embodiment thereof will now be described with reference to the accompanying drawings in which:

FIGURE 1 is a partly broken side elevation of part of an electron microscsope to which a manipulator constructed in accordance with the invention is fitted, FIGURE 2 is a cross-section, to an enlarged scale, on the line 2—2 in FIGURE 1, FIGURE 3 is a cross-section on the line 3—3 in FIGURE 2, FIGURE 4 is a cross-section on the line 4—4 in FIGURE 3, FIGURE 5 is a cross-section on the line 5—5 in FIGURE 3, FIGURE 6 is a cross-section on the line 6—6 in FIGURE 3, FIGURE 7 is a cross-section on the line 7—7 in FIGURE 3, FIGURE 8 is a cross-section on the line 8—8 in FIGURE 1 which shows a plunger assembly 18 mounted on the camera opposite the manipulator, FIGURE 9 is a cross-section corresponding to FIGURE 8 but showing the plunger of assembly 18 in a displaced position, and FIGURE 10 is a perspective view of a specimen mounting rod forming part of the manipulator.

The drawings show part of a column 11 of an electron microscope. Column 11 has an interior chamber 12 which, in use of the microscope, is evacuated by means of a vacuum pump (not shown). The illustrated portion of column 11 is at the high resolution electron diffraction level and at this level the wall of chamber 12 comprises a face plate 13 and a pair of side plates 14, 16. Side plate 14 carries a plunger assembly denoted generally as 18 and side plate 16 forms part of a specimen manipulator which is constructed in accordance with the invention and is denoted generally as 18.

A mounting block 19 having a vertically extending rebate is fixed to the outer face of plate 16 by means of screws 21 and a vertical leaf spring 22 is clamped in the rebate by means of a clamping plate 23 and two screws 24. Leaf spring 22 projects perpendicularly outwardly of plate 16 and is clamped at its outer end into a vertically extending rebate cut into the deepened inner end 26 of a horizontal and outwardly extending beam 27 of rectangular cross-section. Because it is mounted on plate 16 by means of leaf spring 22, horizontal beam 27 can be swung by resilient bending of leaf spring 22 about a vertical axis passing through that spring.

A post 28 provided with a flange 25 is fastened to plate 16 by means of screws 29 so that it extends outwardly from the plate to one side of and somewhat below beam 27. A plate 31 which is machined to a special profile is clamped to the outer end of post 28 by tightening of a clamping screw 32. As is best seen in FIGURE 7, plate 31 has a pair of upstanding portions 33, 34 between which the outer end of beam 27 extends. A horizontal adjustment screw 36 is threadably mounted in portion 33 of plate 31 and is provided at its end with a ruby ball 37 which engages with a sapphire insert 38 let into one side of beam 27 adjacent its outer end. A stiff helical compression spring 39 extends into recesses in beam 27 and portion 34 of plate 31 and provides a strong biasing force which pushes the outer end of beam 27 against ruby ball 37 at the end of adjustment screw 36. The thread of adjustment screw 36 is of very fine pitch and can be actuated to impart small but accurately reproduceable swinging movements to horizontal beam 27.

Beam 27 carries at longitudinal spacing a pair of vertically depending strip spring leafs 41 which extend in width transversely of the beam so that they flex in directions longitudinally of the beam. A lower horizontal beam 42 of rectangular cross-section is carried by the lower ends of spring leafs 41 and an upright post 43 is formed integrally with it at its outer end. Because of the parallelogram formation of spring leaves 41 and beams 27 and 42, beam 42 is movable, upon flexure of leaves 41, in a substantially straight line path extending perpendicularly of the axis about which the two beams can be swung by flexure spring leaf 22. A longitudinal adjusting screw 44 is threadably mounted in profiled plate 31 and has fitted to its inner end a ruby ball 46 which bears against a sapphire insert 47 let into the outer face of post 43. As will be more fully explained hereinafter, beam 42 is biased outwardly by means of a helical compression spring 48 so that insert 38 is held firmly against ruby ball 46.

The upper surface of beam 42 is provided with a longitudinally extending groove 49 which receives a manipulator arm 51, leaves 41 and post 43 being provided with openings 55 and 60 to allow arm 51 to extend through them. Arm 51 extends through an opening 50 in plate 16 into evacuated chamber 12. It is slidable in groove 49 but can be firmly clamped in any required position by means of a saddle clamp 65 consisting of a threaded stem 52 which at one end engages an internally threaded knob 53 and is provided at its other end with an eye 54 through which rod 51 extends.

A housing 56 is fitted into opening 50 in plate 16. This housing has a perforated flange which enables it to be fastened to plate 16 by fastening screws 57. A sealing ring 58 is fitted within a rebate 59 in plate 16 surrounding opening 59 to seal the housing/plate connection and the housing contains a vacuum seal which engages arm 51. The vacuum seal is of the type generally known as a "Wilson" seal. It comprises an annular sheet rubber washer 58 which is clamped at its outer periphery by means of a hollow screw 61 and a clamping ring 62. The internal diameter of annular washer 58 is considerably less than the diameter of arm 51. The rubber close to arm 51 is thus distorted and bent out of the plane of the washer and the bend is maintained towards the high pressure side of the seal by a conical surface 59 machined in housing 56. The bore of housing 56 is tapered at 63 so that washer 58 is supported by conical surface 59 to its inner periphery and washer 58 is located so that its engagement with arm 51 is at the intersection of arm 51 and the vertical axis about which beams 27, 42 can be swung by flexure of leaf 22. The seal allows arm 51 to pivot on a horizontal plane about that vertical axis as well as slide longitudinally through the seal. During movement of arm 51 atmospheric pressure and the elasticity of rubber washer 58 force the inner edge of the washer intimately against arm 51 so that no air leaks past the seal even if the arm is rotated or moved in and out rapidly.

Housing 56 extends through opening 50 and into evacuated chamber 12 in the form of a tubular sheath 64. Manipulator arm 51 extends through sheath 64 and its inner end is provided with a small ring 66 on which a specimen can be mounted. Compression spring 48 bears against the outer face of hollow screw 61 and the inner end of beam 42 and provides a strong biasing force which pushes beam 42 outwardly and maintains sapphire insert 47 in firm engagement with ruby ball 46 on adjustment screw 44.

To locate a specimen within chamber 12, the specimen is mounted on ring 66 and, with saddle clamp 65 released, arm 51 is slid along groove 49 until its inner end has passed through the "Wilson" seal and is located approximately in the required position within the chamber. Saddle clamp 65 is then tightened firmly to clamp arm 51 to beam 42. By operating adjustment screw 36, beams 27, 42 can be swung about the vertical axis of flexure of strip 22 causing the specimen on ring 66 at the tip of arm 51 to be moved with very fine adjustment in one direction. The specimen can also be moved with very fine adjustment in a perpendicular direction by operation of adjustment screw 44. Biasing springs 39 and 48 provide strong biasing forces which eliminate back-lash.

It has been found that the illustrated manipulator, although of much simpler construction, gives a much superior performance than conventional types and will provide accurate and reproduceable movements with very low hysteresis. Because of the use of flexure elements and the fact that the adjustment mechanism is in the atmosphere, the manipulator is much freer in operation than conventional devices. The few parts of this manipulator which are located within the chamber are of very simple shape and are therefore easy to manufacture whereas in conventional manipulators there are many moving parts which must be machined accurately to a small scale so as to fit within the chamber. Furthermore, because there is no bulky mechanism within the chamber to interfere with the electron beam, the manipulator need not be removed when it is desired to examine a specimen at a different level in the electron microscope. It is merely necessary to withdraw manipulator arm 51 into sheath 64. Only one vacuum seal is required and the construction also allows the provision of a very simple air-lock whereby specimens can be removed and replaced without destroying the vacuum within chamber 12 to any great extent. Such an air-lock is provided in the illustrated construction by plunger assembly 18 which is mounted on plate 14.

Plunger assembly 18 comprises a flanged housing 71 which is fastened within an opening 72 in plate 14 by means of clamping screws 73, the housing/plate connection being sealed by an O-ring 74. Housing 71 projects into chamber 12 in the form of a hollow sheath 76 into which a plunger rod 77 extends. A plunger piston 80 is connected to the inner end of plunger rod 77 by means of a knuckle pin 85. This piston is chamfered at 87 and is fitted with an O-ring 88. The outer end of plunger rod 77 is in the form of a manipulating knot 86. A "Wilson" type vacuum seal is provided sealably to engage plunger rod 77. This seal comprises a rubber washer 78 which is clamped at its outer periphery by a clamping ring 79 and a hollow screw 81. A rather long tubular spigot 82 extends from screw 81 and is provided with a slot 83 which is engaged by a pin 84 on plunger rod 77.

Sheath 76 is axially aligned with sheath 64. When a specimen is being examined, plunger rod 77 and piston 80 are retracted to the position shown in FIGURE 8. When it is required to remove the specimen, manipulator arm 51 is retracted into sheath 64 but so that rubber washer 58 is still in engagement therewith and plunger rod 77 and piston 80 are pushed into the position shown in FIGURE 9 so that the inner end of piston 80 enters sheath 64 and O-ring 88 engages the bore of that sheath. Chamfer 87 guides the end of piston 80 into sheath 64, piston 80 being free to pivot about knuckle pin 85 to take up any misalignment between it and sheath 64, and O-ring 88 is a tight fit in the bore of the sheath so that a second seal is formed. Arm 51 is then withdrawn whereupon the seal provided by washer 58 is broken. However chamber 12 remains evacuated because it is sealed by the engagement of piston 80 with sheath 64. Manipulator arm 51 may then be replaced by pushing it through rubber washer 58 and retracting plunger rod 77 and piston 80 back to the position shown in FIGURE 8. The air which entered sheath 64 when arm 51 was withdrawn is now admitted to evacuated chamber 12 but this very small amount of air can be very quickly removed by the vacuum pump of the microscope. Air locks have been provided with conventional manipulators but they allow far greater quantities of air to enter the chamber.

It will be appreciated that an electron microscope of electron diffraction camera which is fitted with a manipulator and an air-lock of the type described above is much more convenient to use than presently known apparatus. Furthermore the above described manipulator provides movements which can be reproduced far more accurately than is possible with known apparatus. However the above described construction is exemplary only and it is to be understood that many modifications and adaptations may be made thereto without departing from the scope of the invention as defined by the appended claims.

I claim:

1. A manipulator for accurately positioning an object within an enclosed chamber comprising a manipulator arm, support means supporting the manipulator arm outside the chamber, said support means being hingedly mounted to said chamber for pivoting movement about a fixed axis, the manipulator arm extending from the support means through a wall of the chamber into the interior of the chamber, a seal which is located at the position where the manipulator arm passes through said wall and in which the manipulator arm is pivotally mounted, and, outside the chamber, first control means for imparting controllable pivoting movement to the support means about said fixed axis and second control means for imparting controllable axial movement to the manipulator arm perpendicular to said fixed axis.

2. A manipulator as claimed in claim 1, in which said support means comprises a first member which is pivotal about said fixed axis and a second member movable with said first member and which is movable toward and away from said pivotal mounting in said seal.

3. A manipulator for accurately positioning an object with respect to a fixed structure, comprising a first adjustment member, a flexible leaf element connecting the first adjustment member to the fixed structure such that the first adjustment member is swingable about an axis by bending of said element, first adjustment means operable controllably to swing the first adjustment member about said axis, a second adjustment member, a plurality of parallel resilient leaf elements connecting the second adjustment member to the first adjustment member such that by resilient bending of said parallel elements the second adjustment member is movable in a substantially stright line path perpendicular to and passing through said axis, second adjustment means operable controllably to move the second adjustment member in said path, and a manipulator arm which is mounted on the second adjustment member and extends therefrom in the direction of said path to a location beyond said axis.

4. A manipulator as claimed in claim 3, in which the first adjustment means comprises an adjustment screw threadably mounted on the fixed structure and biasing means which maintains the first adjustment member in engagement with the adjustment screw.

5. A manipulator as claimed in claim 3, in which the second adjustment means comprises an adjustment screw threadably mounted on the fixed structure and biasing means which maintains the second adjustment member in engagement with that adjustment screw.

6. A manipulator comprising a plate having an opening therein, a first adjustment member, a flexible leaf element connecting the first adjustment member to the plate such that the first adjustment member is swingable about an axis by bending of said element, first adjustment means operable controllably to swing the first adjustment member about said axis, a second adjustment member, a plurality of parallel resilient elements connecting the second adjustment member to the first adjustment member such that by resilient bending of said parallel elements the second adjustment member is movable in a substantially straight line path perpendicular to and passing through said axis, second adjustment means operable controllably to move the second adjustment member in said path, and a manipulator arm mounted on the second adjustment member and extending therefrom in the direction of said path through said opening to a location beyond said axis.

7. A manipulator for accurately positioning an object, comprising a plate, an opening in said plate, a first adjustment member, a flexible leaf element connecting the first adjustment member to the plate such that the first adjustment member is swingable about an axis by bending of said element, first adjustment means operable controllably to swing the first adjustment member about said axis, a second adjustment member, a plurality of parallel resilient elements connecting the second adjustment member to the first adjustment member such that by resilient bending of said parallel elements the second adjustment member is movable in a substantially straight line path perpendicular to and passing through said axis, second adjustment means operable controllably to move the second adjustment member in said path, a manipulator arm mounted on the second adjustment member and extending therefrom in the direction of said path through said opening to a location beyond said axis, and a seal which closes said opening and in which the manipulator arm is pivotally mounted at the intersection of the manipulator arm with said axis.

8. A manipulator comprising a plate having an opening therein, a first adjustment member, a flexible leaf element connecting the first adjustment member to the plate such that the first adjustment member is swingable about an axis by bending of said element, first adjustment means operable controllably to swing the first adjustment member about said axis, a second adjustment member, a plurality of parallel resilient leaf elements connecting the second adjustment member to the first adjustment member such that by resilient bending of said parallel elements the second adjustment member is movable in a substantially straight line path perpendicular to and passing through said axis, second adjustment means operable controllably to move the second adjustment member in said path, a tubular sheath fixed to said plate to surround said opening and extending from the plate in the direction of said path, a manipulator arm mounted on the second adjustment member and extending therefrom in the direction of said path through said opening and said sheath to a location beyond said axis, and a seal which closes said opening and in which the manipulator arm is pivotally mounted at the intersection of the manipulator arm with said axis.

9. A manipulator for accurately positioning an object, comprising a plate having an opening therein, a first adjustment member, a flexible leaf element connecting the first adjustment member to the plate such that the first adjustment member is swingable about an axis by bending of said element, first adjustment means operable controllably to swing the first adjustment member about said axis, a second adjustment member, a plurality of parallel resilient leaf elements connecting the second adjustment member to the first adjustment member such that by resilient bending of said parallel elements the second adjustment member is movable in a substantially straight line path perpendicular to and passing through said axis, second adjustment means operable controllably to move the second adjustment member in said path, a groove in the second adjustment member extending in the direction of said path, a manipulator arm mounted in said groove and clamping means operable to clamp the manipulator arm to the second adjustment member whereby when said clamping means is released the manipulator arm can be slid in said groove in said path.

10. A manipulator for accurately positioning a specimen with respect to a fixed structure, comprising a first adjustment member, a flexible leaf element connecting the first adjustment member to the fixed structure such that the first adjustment member is swingable about an axis by bending of said element, first adjustment means operable controllably to swing the first adjustment member about said axis, a second adjustment member, a plurality of parallel resilient leaf elements connecting the second adjustment member to the first adjustment member such that by resilient bending of said parallel elements the second adjustment member is movable in a substantially straight line path perpendicular to and passing through said axis, second adjustment means operable to controllably move the second adjustment member in said path, a manipulator arm mounted on the second adjustment member and extending therefrom in the direction of said path to a location beyond said axis and adapted to support said specimen at said location.

References Cited

UNITED STATES PATENTS

| | | | |
|---|---|---|---|
| 2,508,317 | 5/1950 | Verhoeff | 250—49.5 |
| 2,845,540 | 7/1958 | Franken et el. | 250—49.5 |
| 3,150,259 | 9/1964 | Wilska | 250—49.5 |

RALPH G. NILSON, *Primary Examiner.*

A. L. BIRCH, *Assistant Examiner.*

U.S. Cl. X.R.

269—51, 71